United States Patent
Bousky

[11] 3,743,378
[45] July 3, 1973

[54] OPTICAL INTENSITY MATCHING MEANS FOR TWO LIGHT BEAMS

[75] Inventor: Samuel Bousky, Redwood City, Calif.

[73] Assignee: Ampex Corporation, Redwood City, Calif.

[22] Filed: July 30, 1971

[21] Appl. No.: 167,752

[52] U.S. Cl. .......................... 350/150, 350/DIG. 2
[51] Int. Cl. ............................................. G02f 1/26
[58] Field of Search .................. 350/147, 150, 151, 350/152, 157, 159, DIG. 2

[56] References Cited
UNITED STATES PATENTS

| | | | |
|---|---|---|---|
| 3,501,220 | 3/1970 | Bernal et al. | 350/150 |
| 3,433,139 | 3/1969 | Beyen et al. | 350/150 |
| 3,588,219 | 6/1971 | Lusfed | 350/159 |
| 2,669,902 | 2/1954 | Barnes | 350/152 |
| 3,484,151 | 12/1969 | Turner | 350/159 |
| 3,540,794 | 11/1970 | Kosanke et al. | 350/152 |
| 3,510,198 | 5/1970 | Pace | 350/152 |
| 3,508,809 | 4/1970 | Wilder et al. | 350/152 |

*Primary Examiner*—Ronald L. Wibert
*Assistant Examiner*—Michael J. Tokar
*Attorney*—Robert G. Clay

[57] ABSTRACT

A partially-reflecting surface of a beam splitter is made of a dielectric reflecting coating which at large incident angles of light is quite sensitive to the direction of polarization of the incident light. Thus two beams divided by the beam splitter and selectively directed to a common point, in parallel directions, etc., may be matched in intensity by placing a half-wave plate in the entrant beam and rotating same to change the polarization direction to alter the proportion of light that is transmitted and/or reflected by the beam splitter.

7 Claims, 5 Drawing Figures

PATENTED JUL 3 1973 3,743,378
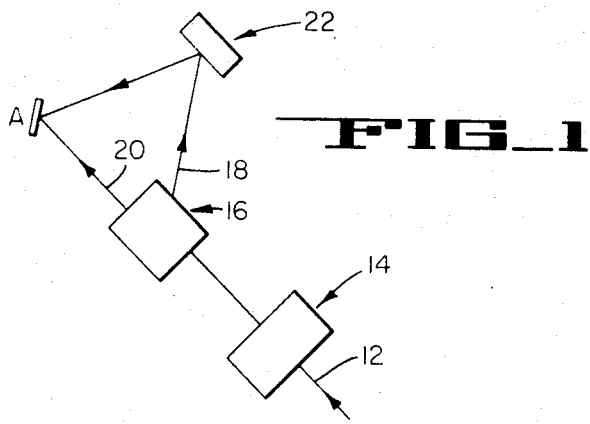
FIG_1
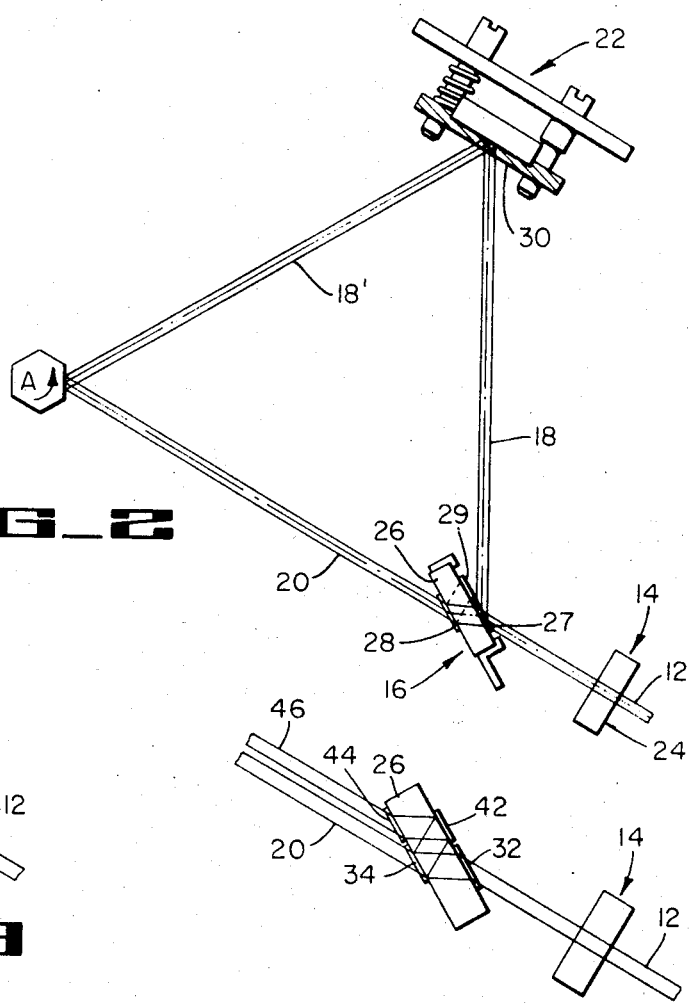
FIG_2
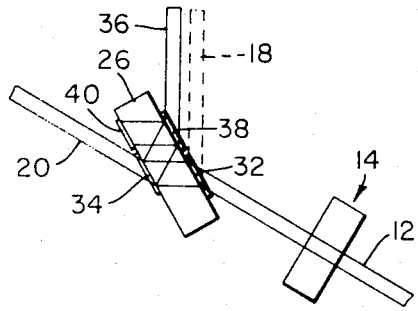
FIG_3
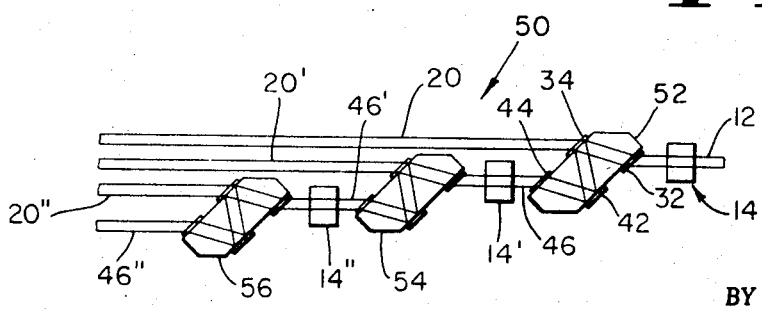
FIG_4
FIG_5
INVENTOR.
SAMUEL BOUSKY
BY Robert H. Clay
ATTORNEY

OPTICAL INTENSITY MATCHING MEANS FOR TWO LIGHT BEAMS

The invention herein described was made in the course of a contract with the Department of the Army.

BACKGROUND OF THE INVENTION

1. FIELD

The present invention relates to optical systems and particularly to a beam dividing arrangement for generating two beams of equal intensity.

2. PRIOR ART

There are various optical devices which require the use of two or more light beams of equal intensities. For example, in a multiple beam light scanner such as used for laser beam recording systems, dual beams of equal intensity separated by a precise angle enter the optical system and converge upon a multi-faced rotating polygon mirror. Use of a pair of beams provides a scan overlap across the medium being recorded upon. However, to provide uniform recording, the dual beams must be of equal intensities.

In such systems a semi-reflecting surface is employed to transmit for example 48 percent of the entrant light beam and reflect 52 percent thereof, and a front surface mirror which directs the beams to a common point reflects 92 percent of the 52 percent beam. Accordingly, the two beams directed together at a point are of equal intensity since 92 percent of 52 percent equal 48 percent. However, optical coatings on the various semi-reflecting and front surface mirrors cannot readily be predicted to within fractions of a percent in performance. That is, although the two beams supposedly should have the same intensity of 48 percent, tolerances must be permitted in preparing the semi-reflecting and front surfaces. In addition, each of the beam losses cannot be adequately determined beforehand. Thus some provision must be made for a relatively precise and continuous adjustment of the relative intensities of the two beams after the optical components are manufactured.

SUMMARY OF THE INVENTION

The present invention utilizes the polarization sensitivity of dielectric reflecting coatings when impinged by a polarized light beam at a large incident angle. Since the entrant beam is polarized, the relative proportion of transmitted and reflected light beams at the beam splitter device, may be precisely adjusted by changing the direction of polarization of the entrant beam.

To this end, a beam splitter device formed of a semi-reflecting surface is disposed at a large angle to an entrant beam. The semi-reflecting surface is selected to transmit and reflect selected percentages of the entrant beam, depending upon the additional optical components used to form the overall system. Means for changing the direction of polarization of the entrant beam is disposed to intercept the entrant beam prior to the beam splitter means. Such polarization directing means may comprise, for example, a mechanically rotatable half-wave plate, an electronically controlled electro-optical effect device such as a Pockels cell, etc. Rotation of the polarization directing means changes the direction of polarization of the entrant beam, to thus alter the proportion of light that is transmitted and reflected at the beam splitter means.

Several alternative embodiments are known for implementing the invention combination, e.g., optical prism means may be employed in place of the optical flat, and various coatings may be employed, the various modifications providing parallel beams, converging beams, etc., of variable intensities with a range, for example of from 5 percent to 10 percent.

BRIEF DESCRIPTION OF THE DRAWINGS

FIG. 1 is an optical block diagram showing the combination of the invention.

FIG. 2 is a plan of one apparatus for implementing the combination of FIG. 1 in accordance with the invention.

FIGS. 3, 4 and 5 are optical diagrams of modifications to the combination of FIG. 2.

DESCRIPTION OF THE PREFERRED EMBODIMENTS

Referring to FIG. 1, a polarized entrant beam of light 12 is generated via a suitable source such as a laser (not shown), and is introduced to a means 14 for changing the direction of polarization of the entrant beam 12. The beam thence is introduced to a beam splitter means 16, which provides a "reflected" and a "transmitted" beam 18, 20 respectively. In this particular illustration, it is desired that the beams 18, 20 impinge a common point A, as for example, when providing a laser recording system. Accordingly, reflected beam 18 is directed to an optical reflector 22 whereupon it is reflected to the point A. Beam 20 is transmitted through the means 14 parallel to the entrant beam 12, to the same point A.

Since the optical reflector 22 dissipates some percentage of the light intensity of reflected beam 18, the transmitted beam 20 is made of less intensity than the reflected beam 18. Thus the beams 18, 20 arrive at point A with essentially the same intensity. However, variations due to tolerances stemming from the preparation of the various optical surfaces of the splitter means 16, optical reflector 22, and due to the fact that beam losses cannot be adequately determined beforehand, must be compensated.

The invention employs the phenomenon that a dielectric reflecting surface, disposed at a large incident angle, is very sensitive to the direction of polarization of the incident light. To this end, rotation of the direction of polarization of the entrant beam 12 via the means for changing direction of polarization 14 alters the proportion of light which is reflected and transmitted as beams 18, 20 respectively, at the beam splitter means 16. Thus the intensities of the beams 18, 20 may be varied through a range of, for example, 5 to 10 percent via the means for changing the direction of polarization 14, without upsetting any positional adjustments of the two beams.

Referring to FIG. 2, there is shown in greater detail optical components which may be utilized to implement the invention combination of FIG. 1. Accordingly, the means for changing the direction of polarization 14 comprises a half-wave plate 24 disposed to intercept the entrant beam 12. The beam splitter means 16 comprises a beam splitter element formed of a plane-parallel optical flat 26, having a partially-reflecting coating 27 on its first surface and an anti-reflecting coating 28 on its second surface. As commonly known in the optical art, a partially-reflecting coating reflects a selected amount of the incident light, while an anti-reflecting coating passes essentially all the incident light. In this exemplary embodiment, both coatings are dielectric and optimized for 632.8 nanometers wavelength and 60° incidence. The entrant beam 12 is thus divided into the two beams 18, 20; the reflected beam 18 is of 52 percent original intensity, and the transmitted beam 20 is of 48 percent original intensity. Note that a totally absorbing coating 29 may be employed on the first surface of the optical flat 26, to absorb and thus prevent reflections caused by any small internal reflection of light (shown in phantom line) from the anti-reflecting coating 28. Reflected beam 18, which is of higher intensity, is further reflected from a metallic coated mirror 30 having about 92 percent reflectance, and is redirected as beam 18' to impinge at point A along with the transmitted beam 20.

The two beams 18', 20 should normally have the same intensity since 92 percent of 52 percent is 48 percent. However, due to the abovementioned tolerances and beam losses, the invention contemplates precisely adjusting the intensities by changing the direction of polarization of the entrant beam 12 by physically rotating the half-wave plate 24.

There are various optical components, surfaces, etc., which may be utilized to replace those particularly described in FIG. 2. For example, the half-wave plate 24, which varies the direction of polarization of the entrant beam in response to mechanical rotation thereof, may be replaced by an electrically energized electro-optical effect device, such as a Pockels cell. The application of current to the cell provides rotation of the direction of polarization of the entrant beam 12, in the manner of the half-wave plate 24.

Furthermore, the reflecting coatings 27, 28 and the optical flat 26 which together form the beam splitter means 16 in FIG. 2, may be replaced by other coating types and arrangements and/or an optical prism (not shown) whereby the reflected and transmitted beams 18, 20 may be made parallel to one another, or at a selected angle, for subsequent utilization by an overall optical system. By way of example only, the coatings (27, 28, etc.) are formed of any of various transparent, dielectric materials with low refraction indices, such as evaporated magnesium fluoride silicon monoxide, etc.

To this end, referring to FIG. 3, the entrant beam 12 is introduced to an anti-reflecting coating 32 (rather than the partially-reflecting coating 27 of FIG. 2) on the first surface of the optical flat 26. The light is refracted and internally directed to a partially-reflecting coating 34 on the second surface of flat 26. The "transmitted" beam 20 passes through the coating 34, and a "reflected" beam 36 is directed from the optical flat 26 via an anti-reflecting coating 38 on the first surface thereof. Note reflected beam 36 is parallel to the beam 18 (shown in phantom line) of FIG. 2, but is spaced therefrom along the length of the flat 26, depending upon the thickness thereof and the angle of incidence of the entrant beam 12. Also note in the FIG. 3 embodiment, the first surface includes an anti-reflecting coating (32, 38), while the second surface includes a partially-reflecting coating (34) respectively. A totally absorbing coating 40 may be employed to absorb light internally reflected from the anti-reflecting coating 38.

In FIG. 4, the entrant beam 12 impinges the optical flat 26 via the anit-reflecting coating 32, and is refracted to strike the partially-reflecting coating 34. "Transmitted" beam 20 of selected intensity is passed through the coating 34 and travels parallel to the entrant beam 12. The "reflected" beam is internally directed to a totally reflecting coating 42 on the first surface of flat 26, whereby it is reflected to an anti-reflecting coating 44 on the second surface. Thus a "reflected" beam 46 is formed by optical flat 26 (beam splitter means 16) which is directed parallel to the "transmitted" beam 20.

In accordance with the invention, the intensities of the beams 20, 36 and 20, 46 of FIGS. 3 and 4 respectively, are varied and thus matched, by varying the direction of polarization of the entrant beam 12 via the means 14.

FIG. 5, provides a cascaded optical system 50 for matching the intensities of a multiple number of light beams, e.g., three or more. The system 50 includes a combination of three of the systems shown in FIG. 4, to effect intensity matching between four beams. Thus entrant beam 12 is passed through the means 14, impinges an optical flat 52 via the anti-reflecting coating 32, and is refracted to strike the partially-reflecting coating 34. Note the flat 52 differs from previous flats 26 in that it has a greater thickness. "Transmitted" beam 20 of selected intensity (viz., 25 percent) is passed through the coating 34 and travels therefrom parallel to the entrant beam 12. The (first) "reflected" beam 46 is internally directed to the totally reflecting coating 42, and thence to the anti-reflecting coating 44, and has an intensity of 80 percent. Due to the thickness of the flat 52, beam 46 is spaced further from beam 20 in FIG. 5 than in FIG. 2, to allow the addition of subsequent systems.

A second polarization changing means 14' is disposed in the (first) reflected beam 46, the latter being then introduced as the entrant beam to another optical flat 54. Flat 54 in turn may provide the same function as flat 52, e.g., provides a pair of output beams (20' of 25 percent, and 46' of 50 percent) whose intensities are varied by means 14'. Thus the intensities of beams 20, 20' and 46' may be matched by selectively rotating the (half-wave plate) means 14, 14'. Still another optical system formed of components 14'' and an optical flat 56 may be added to provide four parallel output beams 20, 20', 20'' and 46'', whose intensities may be varied and thus matched via respective polarization changing means 14, 14' and 14''. Beams 20'' and 46'' are each 25 percent of the original beam intensity. Note that the systems of FIGS. 3 and 4 may be combined to provide a combination optical system for matching intensities of multiple beams which travel in directions other than parallel, etc.

I claim:

1. A light beam intensity matching device for dividing a polarized entrant light beam into a plurality of light beams of equal intensities comprising;

first optical means sensitive to the direction of polarization of the light incident thereon disposed to receive the entrant light beam and to reflect a percentage thereof in accordance with the direction of polarization sensed, wherein the first optical means includes beam splitter means having dielectric reflecting coatings disposed at a selected incident angle to the entrant light beam, second optical means is provided to vary the direction of polarization of the entrant light beam, wherein said second optical means adjusts the amount of transmitted and reflected light from the dielectric reflecting coatings, the beam splitter means including an optical flat having said dielectric reflecting coatings thereon at selected spacings along the sides of the optical flat; and optical utilization apparatus for receiving the reflected and transmitted light beams, wherein varying the direction of polarization between said first and second optical means introduces beams with substantially equal and variable intensities to the utilization apparatus.

2. The light beam intensity matching device of claim 1 wherein the beam splitter means includes a plane-parallel optical flat having said dielectric reflecting coatings thereon, and including partially-reflecting and anti-reflecting surfaces disposed at selected sides of the flat with selected spacings thereof therealong to introduce the reflected and transmitted light beams to the optical utilization apparatus at substantially equal and variable intensities.

3. The light beam intensity matching device of claim 2 wherein the partially-reflecting surface is disposed on the first side of the optical flat to receive the entrant light beam and to form transmitted and reflected beams of selected intensities, and the anit-reflecting surface is disposed on the second side of the flat at selected spacing from the partially-reflecting surface to pass the transmitted beam parallel to the entrant beam.

4. The light beam intensity matching device of claim 2 wherein a plurality of the beam splitter means and second optical means are coupled in cascaded arrangement to provide a corresponding plurality of light beams of substantially equal and variable intensities.

5. The light beam intensity matching device of claim 2 wherein the anti-reflecting surface is disposed on the first side of the optical flat to receive the entrant light beam and exit the reflected beam, and the partially-reflecting surface is disposed on the second side of the flat at a selected spacing from the anti-reflecting surface to form the subsequently transmitted and the reflected beams of selected intensities.

6. The light beam intensity matching device of claim 5 wherein the partially-reflecting surface passes the transmitted beam parallel to the entrant beam and reflects the reflected beam to the opposite side of the optical flat, the device further including an anti-reflecting surface disposed on the first side of the optical flat at selected spacing from the first anti-reflecting surface thereon to pass the reflected beam at selected angle of divergence from the transmitted and entrant beam.

7. The light beam intensity matching device of claim 5 wherein the partially-reflecting surface passes the transmitted beam parallel to the entrant beam and reflects the reflected beam to the first side of the optical flat, the device further including a totally-reflecting surface disposed on the first side of the optical flat at a selected spacing from the anti-reflecting surface thereon to totally reflect the beam inpinging thereon, the device further including an anti-reflecting surface on the second side of the flat at a selected spacing from the partially-reflecting surface thereon to pass the reflected beam parallel to the transmitted and entrant beams.

* * * * *